April 16, 1963 P. J. MAYER, JR 3,085,467
CAMERA

Filed Nov. 25, 1959 2 Sheets-Sheet 1

Inventor
Peter J. Mayer Jr.
By Robert J. Miehle
Atty.

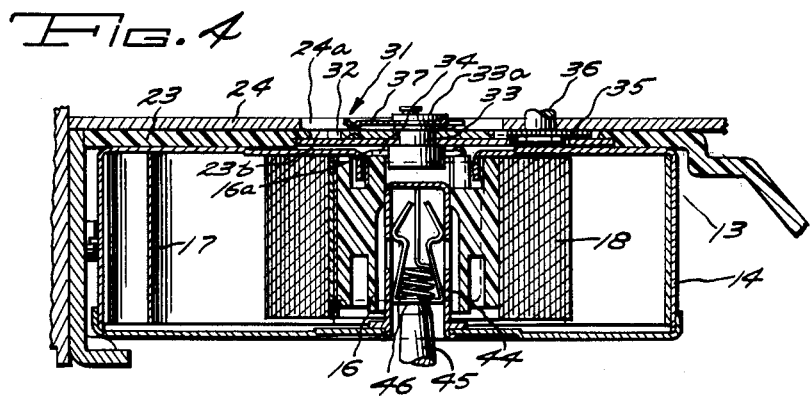
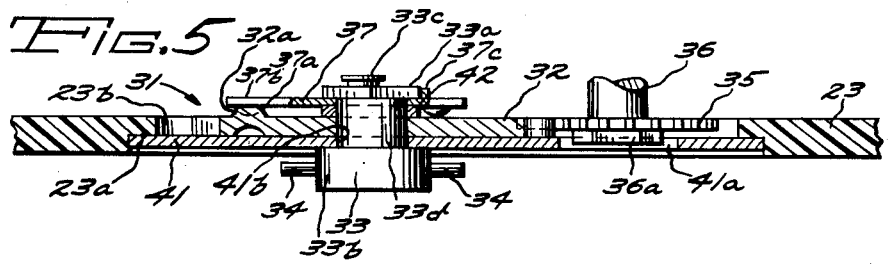
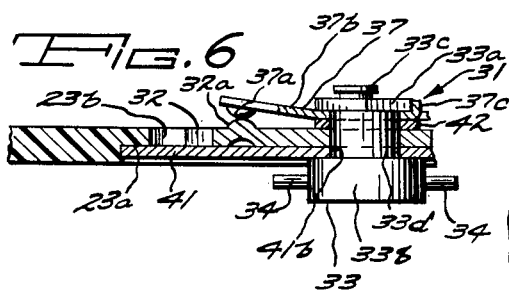
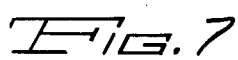
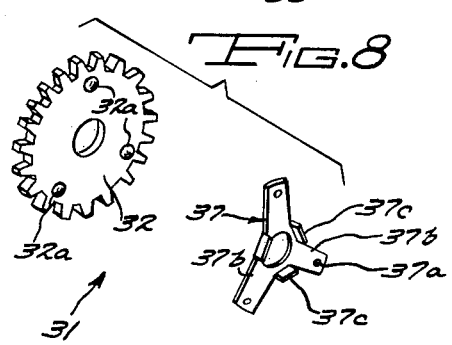

United States Patent Office 3,085,467
Patented Apr. 16, 1963

3,085,467
CAMERA
Peter J. Mayer, Jr., Chicago, Ill., assignor to Bell & Howell Company, Chicago, Ill., a corporation of Illinois
Filed Nov. 25, 1959, Ser. No. 855,310
4 Claims. (Cl. 88—17)

This invention relates to a camera, and more particularly to an overload device for a film take-up drive of a magazine type motion picture camera.

An object of the invention is to provide a film take-up drive which never applies greater than a predetermined tension to the film.

Another object of the invention is to provide a film take-up drive which is effective until a predetermined film tension is reached and then is ineffective until a predetermined amount of slack in the film builds up.

Another object of the invention is to provide an overload drive coupling which drives a film magazine take-up positively until the tension on the film reaches a predetermined amount and then slips freely for a predetermined portion of a revolution to permit slack to build up in the film.

Another object of the invention is to provide a camera having a driven gear having radially spaced projections on one face together with a spider having spring arms for engaging the projections and slidable over the projections when a predetermined torque is reached, the spider serving to drive the take-up spindle of a magazine in the camera.

A complete understanding of the invention may be obtained from the following detailed description of a camera forming a specific embodiment thereof, when read in conjunction with the appended drawings, in which:

FIG. 4 is an enlarged, fragmentary, horizontal sectional view of the camera taken along line 4—4 of FIG. 1 and showing the film magazine and the overload device;

FIG. 5 is an enlarged, generally horizontal, sectional view of the overload device taken along line 5—5 of FIG. 2;

FIG. 6 is an enlarged, fragmentary, sectional view showing a portion of the overload device;

FIG. 7 is a view similar to FIG. 3 but with the elements of the overload device in different positions; and FIG. 8 is an exploded perspective view of elements of the overload device.

The invention provides a camera having a film take-up mechanism together with a drive for the mechanism which slips when tension on the film reaches a predetermined maximum. Preferably the drive includes a take-up spindle driving shaft having a driven coupling member keyed thereto which normally is in driven engagement with a driving coupling member driven positively at a given speed by the camera drive. The coupling members preferably have inter-engaging portions which drive the driven coupling member until the film reaches a predetermined maximum tension and then slip over one another to provide a fractional revolution of lost motion which gives a predetermined slack in the film. The driving coupling member may be a gear rotatable freely on the shaft and driven by the camera drive at a constant rate of speed, and the driven coupling member may be a spider having leaf spring arms provided with rounded projections for resiliently engaging corresponding rounded projections on the gear to provide the torque-limited, lost motion providing drive therebetween.

Figure 1:
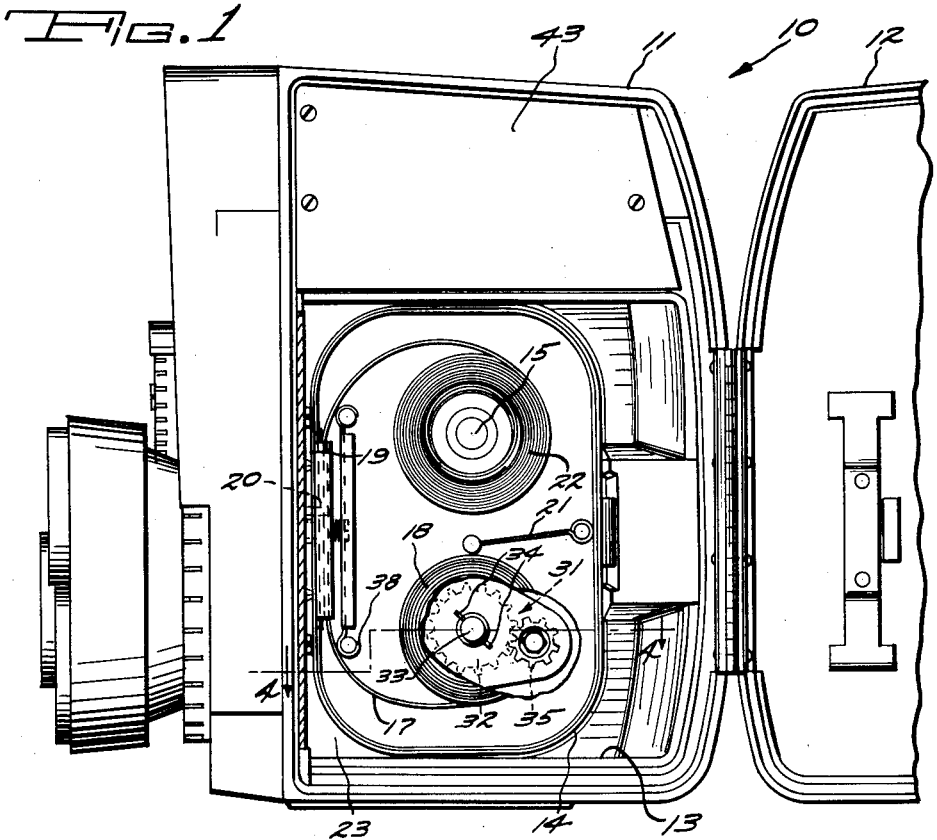
FIG. 1 is a fragmentary, side elevation view of a camera forming one embodiment of the invention.
Figure 2:
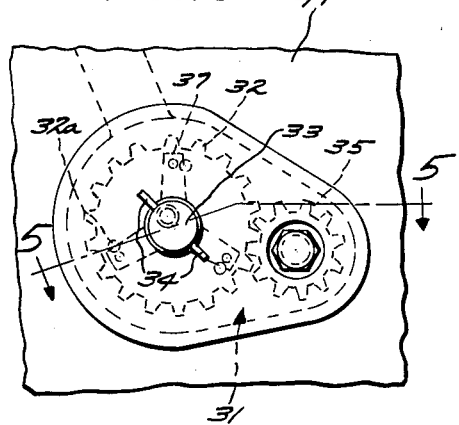
FIG. 2 is an enlarged, fragmentary, side elevation view of an overload device of the camera shown in FIG. 1.

Referring now in detail to the drawings, a motion picture camera 10 (FIG. 1) having a housing 11 and door 12 includes a magazine compartment 13 for receiving a magazine 14 of a known type. The magazine includes spools or spindles 15 and 16 (FIGS. 1 and 4), and, as shown, the spindle 15 constitutes the supply for a film 17 and the spindle 16 is the take-up spindle for winding the film into a roll 18 as the film is advanced through gate 19 by shuttle 20 of the camera. A pivoted arm 21 is positioned between the take-up roll 18 and a supply roll 22 on the spindle 15. The magazine 14 rests against one side of a partition wall 23, and the mechanism plate 24 is fixed to the other side of the wall 23.

Figure 3:
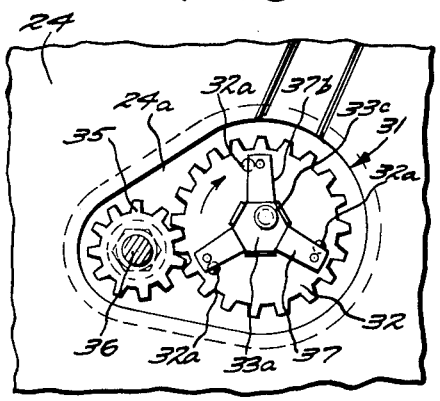
FIG. 3 is an enlarged, fragmentary, side elevation view of the overload device shown in FIG. 2.

To prevent excessive tension above a predetermined tension on the portion of the film between the bottom of the gate 19 and the take-up roll 18, which would occur as the diameter of the take-up roll builds up if the take-up roll were driven at a rigidly fixed number of revolutions per unit of time, the spindle 33 is driven through a maximum torque, lost motion providing coupling 31 (FIGS. 3, 4 and 5). The coupling 31 includes a driving member or gear 32 freely rotatable on a spool driving shaft 33 having driving dogs 34, which positively interlock with drive notches 16a in the spool 16. The gear 32 is driven by a gear 35 keyed to shaft 36 which forms part of and is driven by a camera drive (not shown) of a known type at a constant speed relative to the drive of the shuttle 20 (FIG. 1) and a known shutter (not shown) which are also driven by the camera drive. That is, for a given shuttle speed operation of the camera, the gear 32 is revolved at a constant rate of speed. The gear 32 has rounded driving projections 32a spaced circumferentially about 120° apart, and formed by swaging or other suitable method, and the projections 32a normally engage rounded projections 37a swaged in radial leaf spring arms 37b of a spider-like, driven coupling member 37, which is keyed to a hexagonal head 33a of the shaft 33 by bent over tabs 37c. The arms 37b are also at angles of 120° from one another, and when one of the projections 32a engages one of the projections 37a, all the projections 32a engage all the projections 37a. The rate of revolution of the shaft 33 by the coupling 31 when there is no slippage in the coupling is such that as the roll 18 builds up toward its final size, the roll 18 tends to advance the film 17 (FIG. 1) slightly more rapidly than the film is fed through the gate by the shuttle 20. This causes tension on the portion of the film between a snubbing member 38 of the gate to build up. As the tension reaches a predetermined maximum, the projections 32a (FIGS. 3 and 5) slip past the projections 37a and cam the arms 37b away from the plate 32, as illustrated in FIG. 6, as the projections 32a move past the projections 37a. This relieves the tension on the film and permits slack to build up during a lost motion period in which the driven member 37 loses one-third of a revolution relative to the gear 32. At the end of this lost motion, the projections 32a catch up to the next projections 37a and then the gear 32 drives the member 37 and shaft 33 until another maximum tension condition occurs, at which time the slippage and lost motion again take place. Thus, excessive tension on the film is prevented.

The shaft 33 (FIG. 5) has an enlarged head 33b seating rotatably against a mounting plate 41 secured in a socket 23a in the wall 23, the plate 41 having a clearance hole 41a for a head 36a of shaft 36. A spacer washer 42 is positioned between the coupling members 32 and 37 and is of a thickness approximately equal to the height of the projections 32a. A reduced portion 33c of the shaft is journaled in bore 41b in plate 41. The shaft 33 has a crank pin 33c for driving a connecting rod (not shown) and indicator mechanism visible in viewfinder 43 (FIG. 1) of the camera to indicate when the camera is in operation. The mechanism plate 24 has an opening 24a (FIG. 4) aligned with opening 23b in the wall 23, and the gear 32 and coupling member 37 recess in the openings 23b and 24a, the opening 23b also providing a recess for the gear 35. The spools 15 and 16 (FIGS. 1 and 4) are mounted rotatably on hubs illustrated by hub 44, and a pin 45 carried by the cover 12 moves known latch 46 to a condition releasing the spool 16 for rotation when the cover is closed.

While the invention is thus described, it is not wished to be limited to the precise details described, as changes may be readily made without departing from the spirit of the invention.

What is claimed is:

1. In a motion picture camera of the type including a shuttle, a camera drive for intermittently driving the shuttle, a housing having a magazine compartment and including an inner wall, a magazine fitting into the compartment and including a gate, a take-up spindle mounted in the magazine and having a driving socket adjacent the said inner wall, means for coupling the take-up spindle to the camera drive, comprising: a drive shaft for the take-up spindle extending through the said wall and having a driving portion adapted to interlock with the socket on the take-up spindle, a first coupling member freely mounted for rotation on and relative to said drive shaft, said first coupling member being drivingly connected to the camera drive, a second coupling member keyed on said drive shaft for rotation therewith, at least one interengaging means on each of said coupling members positioned radially away from said drive shaft and on the locus of a cylinder coaxial with the axis of said drive shaft, the interengaging means on each of said coupling members constituting a relatively small proportion of the circumference of the cylinder on which said means lie, said interengaging means on each of said coupling members being adapted to normally engage one another in interlocking engagement whereby said second coupling member will be driven by said first coupling member, said interengaging means being further adapted to resiliently disengage and break away from locking engagement under the predetermined torque exerted on the second coupling member when film on said take-up spindle becomes tightly wound, whereby said first coupling member will rotate relative to said second coupling member with lost motion for a substantial portion of a revolution, and allow film passing from the gate to the take-up spindle to become loose on said take-up spindle.

2. The structure of claim 1 in which the interengaging means consist of rounded projections adapted to disengage one another under a predetermined force, said rounded projections causing said second coupling member to exert a maximum torque at the point the projections commence to break away, and a lower torque as they move over each other.

3. The motion picture camera of claim 1 wherein the first coupling member is a gear adapted to engage a gear in the camera drive and wherein the second coupling member is spider-like, the interengaging means on the two coupling members constituting rounded projections.

4. The motion picture camera of claim 3 wherein the spider-like coupling member has resilient arms, said arms carrying the rounded projections, an enlarged head on the drive shaft for the take-up spindle having flats thereon, said spider-like coupling member having a central portion provided with a bore fitting closely onto said driveshaft and also having tabs extending transversely of the central portion and engaging the flats on the head of the driveshaft to key the spider-like coupling member to the driveshaft.

References Cited in the file of this patent

UNITED STATES PATENTS

| | | |
|---|---|---|
| 2,161,341 | Fairbanks | June 6, 1939 |
| 2,163,179 | Porter | June 20, 1939 |
| 2,165,363 | Fairbanks | July 11, 1939 |
| 2,449,626 | Suthann | Sept. 21, 1948 |
| 2,560,564 | Foster et al. | July 17, 1951 |
| 2,669,833 | Hill et al. | Feb. 23, 1954 |
| 2,683,362 | Bowman | July 13, 1954 |